Patented Mar. 8, 1938

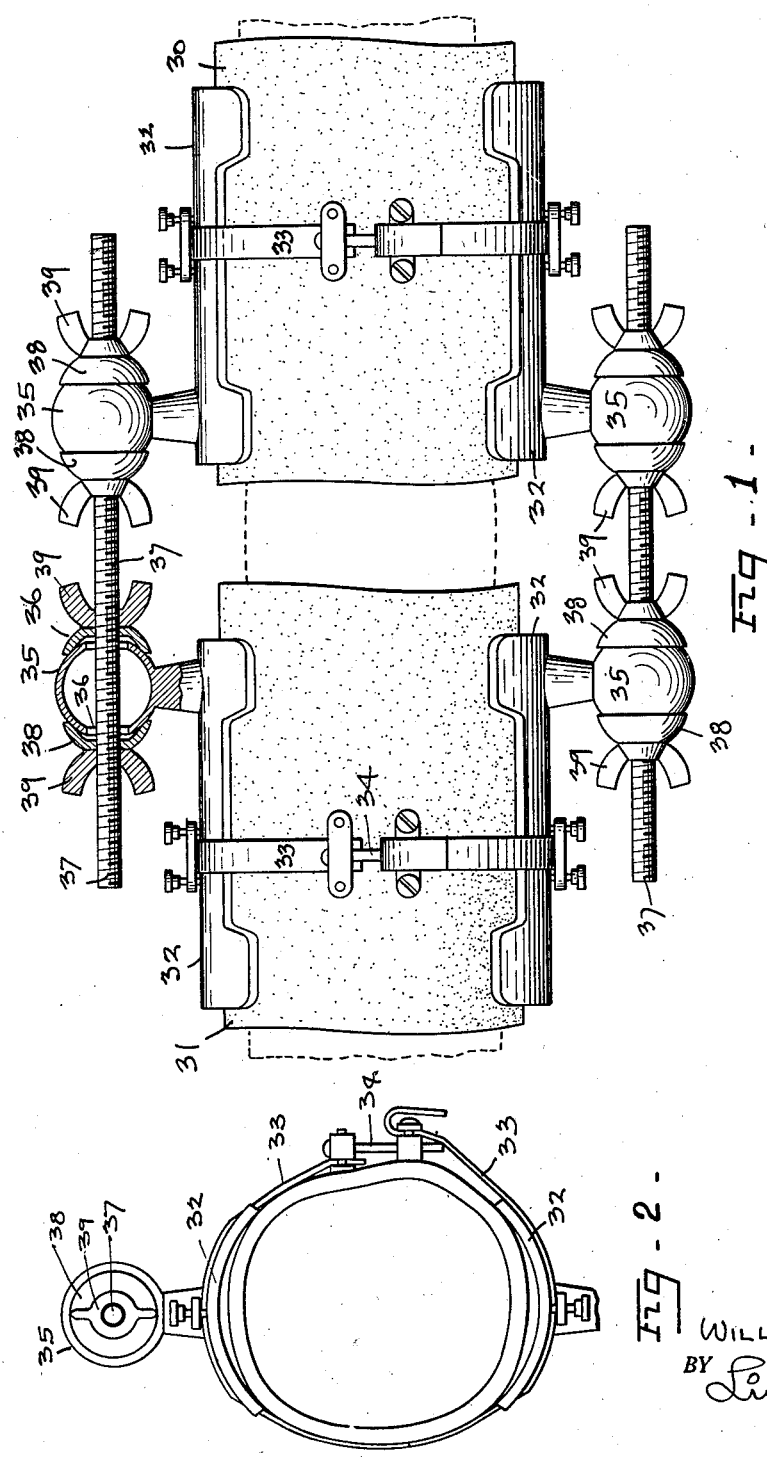

2,110,414

UNITED STATES PATENT OFFICE 2,110,414

BONE-SETTING APPARATUS

William L. Bell, Oakland, Calif., assignor to Gilbert Hyde Chick, Oakland, Calif.

Application March 16, 1936, Serial No. 68,985

3 Claims. (Cl. 128—84)

This invention relates to an appliance to be used in setting broken or fractured bones in either the legs or arms.

An object of the invention is to provide an apparatus for properly aligning broken or fractured bones in either a leg or an arm so that the separated bone parts will knit or mend in the natural and normal condition.

A further object of the invention is to provide an apparatus in which a break or fracture in either an arm or a leg may be treated in such a manner that the portions of the limb will be in proper registry with each other and any desired adjustment of the limb may be had to effect a recovery thereof to the normal condition.

A further object of the invention is to provide a surgical appliance that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawing:

Fig. 1 is a plan view of the splint applied to a two part cast.

Fig. 2 is an end view of Fig. 1.

In the apparatus shown in Figs. 1 and 2, I provide the respective plaster cast members 30 and 31, arranged upon the limb in relation to the fracture to be set. An identical base member 32 is provided on diametrically opposite sides of each of the respective plaster casts, and said base members are held together by a flexible strap 33, the ends of said strap being brought together by any desirable degree of tension being exerted thereon by the turn-buckle or adjusting screw 34. On the exterior of each base member 32 adjacent an end thereof, I have provided a substantially spherical seat 35, said seat being hollow with relatively thin walls and having openings 36 on diametrically opposite sides thereof in line with the major longitudinal axis of the respective casts 30 and 31. A threaded shaft 37 extends through aligned openings 36 in adjacent balls 35 on the respective casts 31 and 32. Cup washers 38 are mounted on the shaft 37 on opposite sides of the balls 35, and wing nuts 39 are threaded on the shaft 37 whereby each of said wing nuts may be screwed against the respective cup washers 38 to tightly bind the ball 35 to the shaft 37 and prevent any relative movement between the shaft 37 and balls 35.

The openings 36 through the ball seats 35 are larger in diameter than the shaft 37, whereby any desired angular range of the threaded shaft 37 relative to the ball seats 35 may be obtained. The pairs of ball seats 35 on each of the opposite sides of the cast members 30 and 31, permit of a universal adjustment of the cast members with relation to each other and hence the fractured bone may be set and aligned into any desired position. By this particular type of apparatus, tremendous pressure may be exerted on the limb to move the fractured portions of the bone either toward or from each other. Rotative adjustment may also be made very readily between the respective cast members 30 and 31.

Having thus described this invention, what I claim and desire to secure by Letters Patent is:

1. An apparatus in the class described, including separate leg engaging means each having a projecting ball thereon with an opening therethrough; a threaded shaft passing through each of said balls and capable of lateral movement angularly to the axis of said openings; concave washers slidable on said shaft and adapted to engage the opposite sides of each ball respectively; and nuts threaded on said shaft and adapted to jam said washers against said balls respectively.

2. An apparatus in the class described including separate leg engaging means; a pair of laterally projecting balls disposed on opposite sides of each of said leg engaging means respectively; threaded shafts passing through the substantially alined balls on said leg engaging means respectively; concave washers slidable on said shafts and adapted to engage the opposite sides of each ball respectively.

3. An apparatus in the class described, including separate leg engaging means; a pair of laterally projecting hollow balls having relatively thin walls, and disposed on opposite sides of each of said leg engaging means respectively; threaded shafts passing through the substantially alined balls on said leg engaging means respectively; concave washers having radii less than the radii of said balls, slidable on said shafts and adapted to engage the opposite sides of each ball respectively.

WILLIAM L. BELL.